United States Patent Office 3,651,133
Patented Mar. 21, 1972

3,651,133
o-ALKYLOXY-BENZOYL-HYDRAZONES OF PYRUVIC ACID EMPLOYABLE AS ANTIRHEUMATIC, ANTIPYRETIC AND ANALGESIC PRODUCTS
Mario Ghelardoni, Firenze, and Filippo Russo, Giarre, Catania, Italy, assignors to A. Menarini S.A.S., Firenze, Italy
No Drawing. Filed Nov. 22, 1966, Ser. No. 596,092
Claims priority, application Italy, Nov. 23, 1965, 26,344/65
Int. Cl. C07c 109/14
U.S. Cl. 260—519
1 Claim

ABSTRACT OF THE DISCLOSURE

A compound having therapeutic properties and the process for the preparation thereof. The therapeutic compound has the formula:

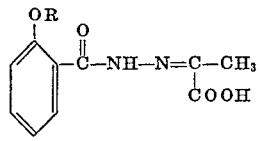

wherein R may be hydrogen or a lower alkyl group. The process for preparing the therapeutic compound of this invention comprises condensing the hydrazide of the appropriate o-substituted-benzoic acid with pyruvic acid in a solvent such as ethanol or diethyl ether.

---

The present invention relates to a product based on o-substituted benzoyl-hydrazones of pyruvic acid, and having the formula:

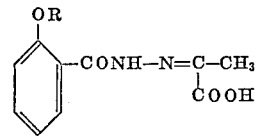

wherein R is selected from the group consisting of: —H, —CH$_3$, —C$_2$H$_5$, —C$_4$H$_9$n, —C$_5$H$_{11}$n, —C$_8$H$_{17}$n and the letter n means normal. These derivatives have pharmacological activity and can be employed in therapy as antirheumatic, antipyretic and analgesic substances. More particularly these compounds may be:

(1) o-hydroxy-benzoyl-hydrazone of pyruvic acid wherein R=—H and melting point 194–196° C. with decomposition;

(2) o-methoxy-benzoyl-hydrazone of pyruvic acid wherein R=—CH$_3$ and melting point 178–180° C. with decomposition;

(3) o-ethoxy-benzoyl-hydrazone of pyruvic acid wherein R=—C$_2$H$_5$ and the melting point is 184–186° C. with decomposition;

(4) o-n-butoxy-benzoyl-hydrazone of pyruvic acid wherein R=—C$_4$H$_9$n and the melting point is 155–156° C. with decomposition;

(5) o-n-amyloxy-benzoyl-hydrazone of pyruvic acid wherein R=—C$_5$H$_{11}$n and the melting point is 107–111° C. with decomposition;

(6) o-n-octyloxy-benzoyl-hydrazone of pyruvic acid wherein R=—C$_8$H$_{17}$n and melting point 95–96° C. with decomposition.

The products of the present invention may be obtained by synthesis. In particular, these products may be prepared by condensation of the hydrazides of the appropriate o-substituted-benzoic acids with the pyruvic acid in ethanol or diethyl ether.

An example of the preparation of the o-ethoxy-benzoyl-hydrazone of pyruvic acid wherein R=—C$_2$H$_5$ follows is hereinafter referred to.

9.80 g. of pyruvic acid are added to 20 g. of the hydrazide of o-ethoxy-benzoic acid dissolved in 80 cc. of ethanol and the mixture is boiled for 30 minutes. On cooling, a crystalline product is formed, which, on being filtered and crystallized repeatedly in ethanol, has a melting point of 184–186° C. with decomposition.

What is claimed is:

1. A compound having the formula:

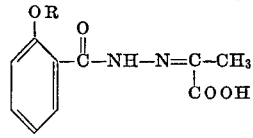

wherein R is selected from the group consisting of —H, —CH$_3$, —C$_2$H$_5$, —C$_4$H$_9$n, —C$_5$H$_{11}$n, and —C$_8$H$_{17}$n.

References Cited

Sumgawa et al., Chemical Abstracts (1963), vol. 58, p. 6774a.

Burger, Medicinal Chemistry (1960), Interscience, New York, pp. 341 and 348.

Finar, I. L., Organic Chemistry (1963), vol. I, pub. by R. Clay and Co., Ltd., Bungay, Suffolk, England.

JAMES A. PATTEN, Primary Examiner

U.S. Cl. X.R.

424—319